United States Patent
Pulla et al.

(10) Patent No.: US 8,682,985 B2
(45) Date of Patent: *Mar. 25, 2014

(54) MESSAGE TRACKING BETWEEN ORGANIZATIONS

(75) Inventors: Gautam Pulla, Redmond, WA (US); Yamin Wang, Bellevue, WA (US); Sara L. Manning, Bellevue, WA (US); Shawn M. Thomas, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/353,980

(22) Filed: Jan. 15, 2009

(65) Prior Publication Data

US 2010/0179997 A1    Jul. 15, 2010

(51) Int. Cl.
*G06F 15/16* (2006.01)
(52) U.S. Cl.
USPC ........ 709/206; 709/204; 709/205; 709/207; 713/168; 713/170; 726/23
(58) Field of Classification Search
USPC .................................... 709/204–207; 726/23
See application file for complete search history.

(56) References Cited

U.S. PATENT DOCUMENTS

| | | | | |
|---|---|---|---|---|
| 5,920,697 A * | 7/1999 | Masters et al. | | 709/219 |
| 6,163,802 A * | 12/2000 | Lin et al. | | 709/217 |
| 6,678,827 B1 * | 1/2004 | Rothermel et al. | | 726/6 |
| 6,823,452 B1 * | 11/2004 | Doyle et al. | | 713/156 |
| 6,976,164 B1 * | 12/2005 | King et al. | | 713/156 |
| 7,171,450 B2 * | 1/2007 | Wallace et al. | | 709/206 |
| 7,181,764 B2 * | 2/2007 | Zhu et al. | | 726/4 |
| 7,188,158 B1 * | 3/2007 | Stanton et al. | | 709/220 |
| 7,404,006 B1 | 7/2008 | Slaughter et al. | | |
| 7,468,729 B1 * | 12/2008 | Levinson | | 345/473 |
| 7,519,818 B2 * | 4/2009 | Levin et al. | | 713/170 |
| 7,568,095 B2 * | 7/2009 | Thornton et al. | | 713/156 |
| 7,577,984 B2 * | 8/2009 | Levin et al. | | 726/2 |
| 7,580,981 B1 * | 8/2009 | Golub | | 709/206 |
| 7,653,812 B2 * | 1/2010 | Levin et al. | | 713/168 |
| 7,664,947 B2 * | 2/2010 | Fang | | 713/152 |

(Continued)

FOREIGN PATENT DOCUMENTS

WO    02059804 A1    8/2002

OTHER PUBLICATIONS

Semeniuk, Joel, "Designing and Building Tracking Solutions", Retrieved at <<http://www.informit.com/articles/article.aspx?p=130643&seqNum=5>>, Jun. 5, 2000.

(Continued)

*Primary Examiner* — Backhean Tiv
(74) *Attorney, Agent, or Firm* — Louise Bowman; Brian Haslam; Micky Minhas

(57) ABSTRACT

Architecture that facilitates cross-boundary message tracking based on a trust relationship in existence between a sender network and a recipient network. A tracking service is deployed in each network as a proxy to obtain message events for each hop that passes the message on to the recipient. Tracking can include a search task and a get task. Messages can be found in reports that match message search criteria. The search task returns an array of search results objects, each object identifying a single tracking report. A selected object is pipelined into the get task to return the detailed tracking report for the selected message.

20 Claims, 12 Drawing Sheets

(56) References Cited

U.S. PATENT DOCUMENTS

| | | | |
|---|---|---|---|
| 7,673,315 B1* | 3/2010 | Wong et al. ............... 725/51 |
| 7,788,399 B2* | 8/2010 | Brouk et al. .............. 709/238 |
| 7,788,485 B2* | 8/2010 | Connell .................... 713/157 |
| 7,814,313 B2* | 10/2010 | Riittinen .................. 713/157 |
| 7,822,974 B2* | 10/2010 | Kinser et al. ............. 713/156 |
| 7,831,829 B2* | 11/2010 | Appenzeller et al. ..... 713/170 |
| 7,953,814 B1* | 5/2011 | Chasin et al. ............ 709/207 |
| 2002/0120697 A1 | 8/2002 | Generous et al. |
| 2003/0231207 A1 | 12/2003 | Huang |
| 2004/0059789 A1* | 3/2004 | Shum ....................... 709/206 |
| 2004/0083207 A1* | 4/2004 | Jeffries et al. ............ 707/3 |
| 2004/0122937 A1 | 6/2004 | Huang et al. |
| 2004/0128392 A1* | 7/2004 | Blakley et al. ........... 709/229 |
| 2004/0133520 A1* | 7/2004 | Callas et al. ............. 705/51 |
| 2005/0198508 A1* | 9/2005 | Beck ........................ 713/170 |
| 2005/0216587 A1* | 9/2005 | John ......................... 709/225 |
| 2006/0010213 A1* | 1/2006 | Mehta ...................... 709/206 |
| 2006/0031355 A1* | 2/2006 | Patrick et al. ............ 709/206 |
| 2006/0041628 A1* | 2/2006 | Muller ..................... 709/206 |
| 2006/0242014 A1* | 10/2006 | Marshall et al. .......... 705/14 |
| 2007/0005702 A1* | 1/2007 | Tokuda et al. ............ 709/206 |
| 2007/0047702 A1* | 3/2007 | Newell et al. ............ 379/101.01 |
| 2007/0107059 A1* | 5/2007 | Chasin et al. ............ 726/23 |
| 2007/0162394 A1* | 7/2007 | Zager et al. .............. 705/51 |
| 2007/0180031 A1* | 8/2007 | Stern et al. ............... 709/206 |
| 2007/0255815 A1* | 11/2007 | Justice et al. ............. 709/223 |
| 2007/0255823 A1 | 11/2007 | Astley et al. |
| 2007/0261099 A1* | 11/2007 | Broussard et al. ........ 726/1 |
| 2008/0091940 A1* | 4/2008 | Dean ........................ 713/157 |
| 2008/0215474 A1* | 9/2008 | Graham .................... 705/37 |
| 2008/0235043 A1* | 9/2008 | Goulandris et al. ...... 705/1 |
| 2008/0235760 A1* | 9/2008 | Broussard et al. ........ 726/1 |
| 2008/0250106 A1* | 10/2008 | Rugg et al. ............... 709/206 |
| 2008/0275957 A1* | 11/2008 | Pouzin et al. ............ 709/206 |
| 2009/0037537 A1* | 2/2009 | Callanan et al. .......... 709/206 |
| 2009/0049141 A1* | 2/2009 | Jones et al. ............... 709/206 |
| 2009/0187553 A1* | 7/2009 | Sarkar et al. ............. 707/5 |
| 2009/0216678 A1* | 8/2009 | May et al. ................ 705/50 |
| 2009/0276732 A1* | 11/2009 | Dervan ..................... 715/853 |
| 2009/0319783 A1* | 12/2009 | Thornton et al. ......... 713/156 |
| 2010/0153282 A1* | 6/2010 | Graham .................... 705/310 |
| 2010/0179997 A1* | 7/2010 | Pulla et al. ............... 709/206 |
| 2010/0217820 A1* | 8/2010 | Brouk et al. .............. 709/206 |
| 2011/0112976 A1* | 5/2011 | Ryan et al. ............... 705/319 |

OTHER PUBLICATIONS

"How to Search Message Tracking Logs", Retrieved at <<http://technet.microsoft.com/en-us/library/bb124926.aspx>>, Aug. 28, 2007.

"Optimizing Service Based Networking with Cisco AON", Retrieved at <<http://www.cisco.com/en/US/prod/collateral/modules/ps6438/prod_white_paper0900aecd806a49ef_ps6480_Products_White_Paper.html>>, Nov. 12, 2008.

* cited by examiner

MESSAGE TRACKING BETWEEN ORGANIZATIONS

BACKGROUND

Messages such as email are processed in a highly distributed fashion, oftentimes handed off from server to server and organization to organization. The servers write log files detailing the processing steps for each message as the message transits the networks. The ability to trace message delivery end-to-end is useful for troubleshooting mail delivery problems, and also when surfaced to the senders or recipients of the messages to provide transparency into the message system.

An absence of tracking mechanisms has in the past resulted in significant expenditure by IT (information technology) departments to hire staff to manually look at log files and answer user complaints related to mail delivery delays, for example.

Existing tracking mechanisms may work well within the scope of a single organization; however, when a message is handed off to another organization or network, the tracking mechanism is unable to track the message cross-boundary because of the absence of a standard and defined way to establish trust between organizations, to request tracking data, and to put the data together.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates cross-boundary message tracking based on a trust relationship in existence between a sender network and a recipient network. A tracking service is deployed in each network as a proxy to obtain message events for each hop that passes the message on to the recipient. This also applies across multiple network boundaries to the recipient.

Tracking can include a search task and a get task. Given certain message criteria, messages can be found that match the criteria. The search task finds all messages matching the criteria. The search task returns an array of search results objects, each object identifying a single tracking report. A user interface renders this object to the end user as a list of messages of which the user can select one message to get the associated detailed report. When the user chooses one of the results objects from the search task, the selected object is pipelined into the get task. The get task then returns the detailed tracking report for the selected message. The output of the get task is an array of recipient event objects, which are nodes of a tracking tree. The tree can be used to find message pathways to the various recipients.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
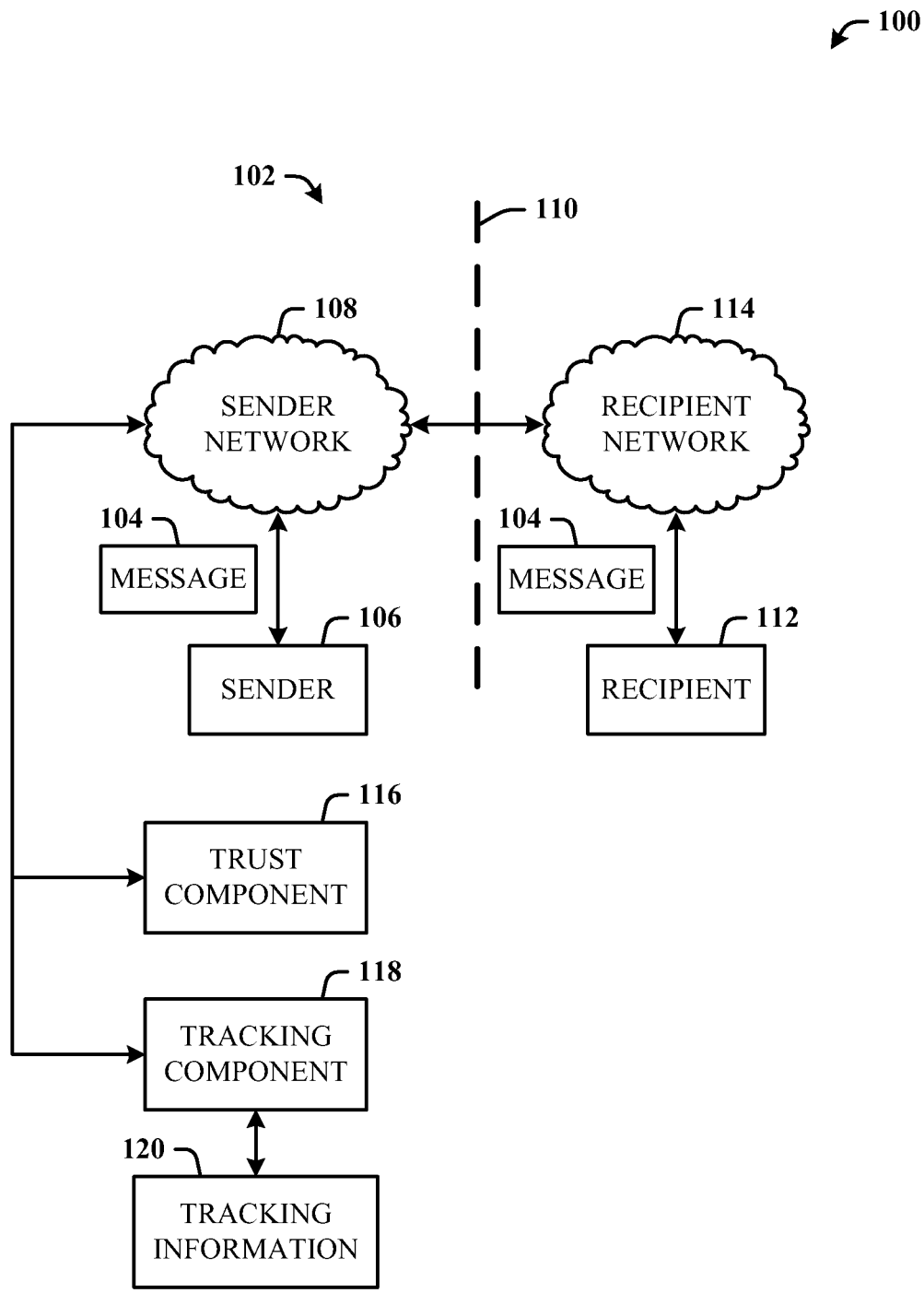
FIG. 1 illustrates a computer-implemented message tracking system in accordance with the disclosed architecture.

A major problem when tracking messages across network boundaries (e.g., organizations) is that the sending network attempting to do the tracking does not have full visibility of the message path in the receiving network.

The disclosed architecture facilitates the aggregation of tracking data across network boundaries using a trust relationship in order to present a comprehensive end-to-end view of the message delivery.

Consider an example where Company A has a trust relationship with its many suppliers. An employee of Company A sends a time-sensitive message to an employee at a Supplier B. The message is delayed in the supplier's email network. The Company A employee attempts to track the message status to determine what has happened. Conventionally, this can result in a call to the help-desk of the Supplier B email department, the resolution of which can be difficult and time-consuming.

However, the disclosed cross-organizational message-tracking architecture makes it is possible for the message-tracking software on the network of Company A to determine that the recipient network has a trust relationship with Company A. The Company A network can seamlessly authenticate to the Supplier B network, request the message status within the Supplier B email network, combine the events on both the Company A network and Supplier B network, and present the events to the user to indicate that the message has been temporarily delayed.

Discovery can occur via sharing relationships established between organizations. For example, if Organization A sent a message addressed to user@Organization-B, and there is a sharing relationship between the Organization A and Organization B, then Organization A can use the relationship to discover the location (e.g., URL) of the tracking service at Organization B.

The disclosed architecture can also handle "blind spots". A blind-spot occurs when a message, in transiting between organizations, is forwarded to a third party such as a virus scanning service in a destination organization. Neither organization has visibility into this third party. Therefore, the 'trail of the message' is lost when the message transits into the blind spot.

In the context of the previous example, if there is a blind spot between Organization A and Organization B, the tracking process may lose the message at the boundary between Organization A and Organization B. The tracking process then issues a search request against Organization B's tracking service to locate the message entry point within Organization B. This is initiated by invoking a search task (described as well in FIG. 2) that searches across all "edge" servers (email servers responsible for receiving messages into an organization from an outside organization (e.g., the Internet) in Organization B to locate the message's entry point into Organization B. If there are no edge servers, then Organization B searches against all transport servers.

When an event for the message is found, it is still unknown whether that event was the *first* event denoting entry of the message into the organization. Starting the search from any event other than the first event can produce an incomplete search results. Thus, Organization B tracks backward to locate the first-entry of the message into the organization, and then tracks forward from that point using the normal message-tracking algorithm.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented message tracking system 100 in accordance with the disclosed architecture. The system 100 can include a communications framework 102 for communicating a message 104 from a sender 106 of a sender network 108 across a network boundary 110 to a recipient 112 of a recipient network 114. A trust component 116 determines a trust relationship between the sender network 108 and the recipient network 114. A tracking component 118 aggregates tracking information 120 of the message 104 obtained from the sender network 108, across the network boundary 110, and through the recipient network 114 based on the trust relationship.

Aggregation is accomplished by concatenating the tracking information (or reports) from the various organizations together. The algorithm correctly identifies the points at which concatenation occurs. For example, consider message tracking from Organization A into Organization B. The same message may transit between Organization A and Organization B multiple times, with different transits occurring for different recipients. For example, the message could be addressed to recipients at x@Organization-B and y@Organization-B, which may result in two distinct messages sent and received over SMTP (simple mail transfer protocol) between Organization A and Organization B. The algorithm matches up the recipients so that the tracking is performed properly.

Although depicted as including the trust component 116 and tracking component 118 on the sender network, it is to be appreciated that similar components can be employed on the recipient network 114, such that when the recipient 112 becomes a sender and sends a message to another recipient, the trust and tracking components on the recipient network 114 generate the cross-boundary tracking information for purposes thereof.

Any general mechanism for authentication and trust may be used (e.g., certificate based, Kerberos™, simple username/password authentication, etc). Additionally, any generic network communication mechanism (e.g., a general web service, any cross-organization RPC (remote procedure call) mechanism, or raw TCP/IP data), can be employed. The same processing logic disclosed herein can be applied to similar entities that represent disjoint mail systems with trust, that is, it is possible that other email software systems do not refer to email networks as organizations or sites; however, this architecture is equally applicable for those as well.

Figure 2:
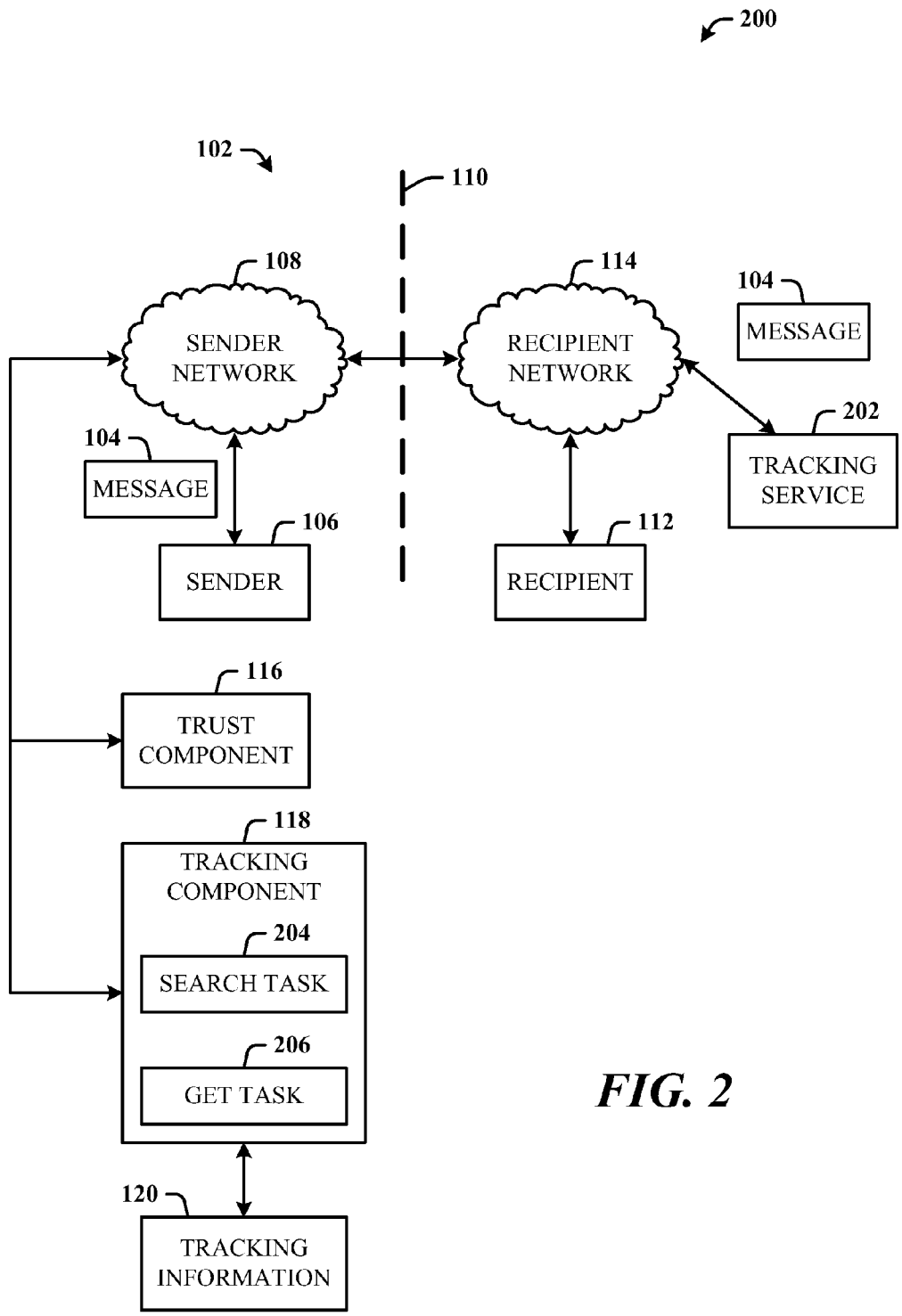
FIG. 2 illustrates a more detailed embodiment of a system where the recipient network includes a tracking service.

FIG. 2 illustrates a more detailed embodiment of a system 200 where the recipient network 114 includes a tracking service 202. The tracking service 202 is deployed in the recipient network 114 (and all networks such as the sender network 108) for providing event information related to tracking the message 104 across hops in the recipient network 114. The tracking service 202 acts as a proxy such that the tracking service 202 obtains event information from hops in the recipient network 114 through which the message 104 may travel. The tracking component 118 communicates with the tracking service 202 to obtain the tracking information 120 of the message 104 through the sender network 108 and the recipient network 114. The tracking service 202 returns all partial paths that resulted in a hand-off of any recipient in the recipient network 114 to another network.

The tracking component 118 creates a tracking event tree that represents events for distribution of the message 104 to multiple recipients and across multiple hops. The tracking component 118 includes a search task 204 for finding tracking information for messages that match message criteria, and a get task 206 for selecting and returning tracking information for the message 104. The get task 206 includes a summary mode that presents events for all recipients of the message and delivery status of the message to each recipient, and a recipient path mode that provides a history of events that occurred for a specific recipient.

Figure 3:
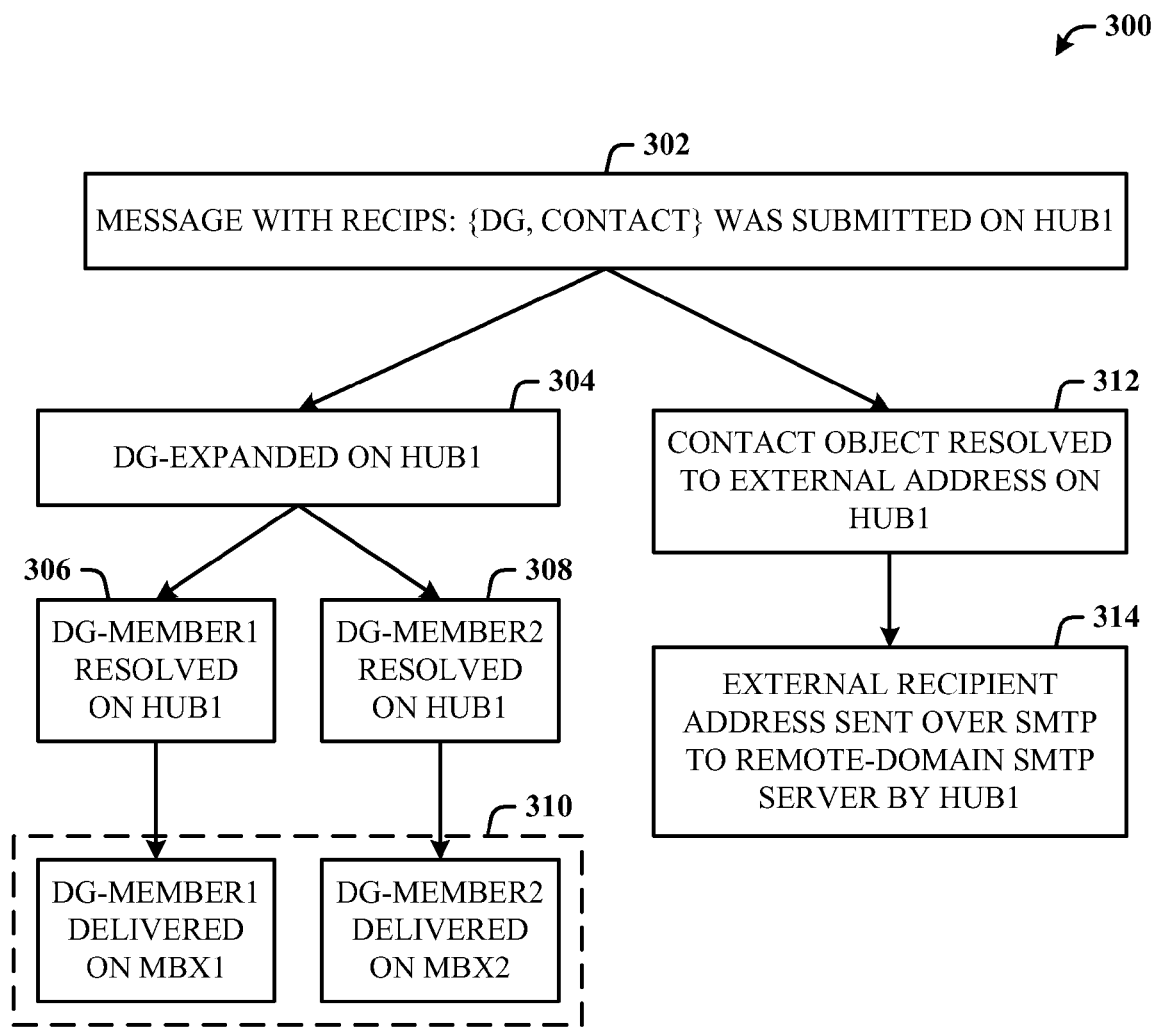
FIG. 3 illustrates a representation of the tracking information as a tracking event tree that can be created by the tracking component.

FIG. 3 illustrates a representation of the tracking information as a tracking event tree 300 that can be created by the tracking component. The tree 300 is employed where a message 302 is distributed to multiple recipients (e.g., a distribution list, distribution group, etc.). In this example tree 300, the message 302 is being sent to two recipients: a distribution group (DG) and a contact. In other words, a message may have multiple recipients, and the tracking events occurring for the recipients may diverge. For example, at 304, the distribution group can be expanded on a hub (HUB1), resulting in two "child-recipients"; a first member 306 (denoted DG-Member1) and a second member 308 (denoted DG-Member2), that are resolved and delivered to various mailboxes distributed across different mailbox servers in the network (e.g., organization). The first member 306 is delivered to a first mailbox MBX1, and the second member 308 is delivered to a second mailbox MBX2. The associated delivery events 310 are logged on the different physical servers MBX1 and MBX2 for DG-Member1 and DG-Member2, respectively. All other events are logged on HUB1.

Another branch of the tree 300 is for the contact recipient that is forwarded to an external domain. At 312, the contact object is resolved to an external address on HUb1. At 314, the external recipient address is sent over SMTP, for example, to a remote domain SMTP server by HUb1.

As a brief overview, message tracking logs are files that are written locally on hub servers and mailbox servers, as the servers execute various processing steps on messages that transit through the servers. A row of data in the log file includes the message-sender, message-subject, unique message-id, message-recipients, an "event" that occurred for the message, or a recipient of the message (e.g., submission, distribution group expansion, delivery, or failure to deliver are all events) and the timestamp of when the event occurred.

On each mailbox server and hub server, there is also a log-search service that indexes certain useful columns in the log files (e.g., such as sender and message-id) and exposes an RPC endpoint to which clients may connect and retrieve tracking events specifying criteria such as message-id, sender, subject keywords, etc. Any data that is recorded in the logs can be used as criteria. The log-search service can search the log files for rows matching the criteria and returns these rows to the client (e.g., an RPC client).

Hub servers and mailbox servers write a significant number of processing steps (e.g., all steps) that are executed on each message into the log file as tracking events. It is possible to get all the events that occurred for a message by querying the log file to return all events for the unique message-id of the message. If a message is transferred to a different server (e.g., SMTP send or mailbox delivery) the transfer is also recorded in the log file as a tracking event and the identity of the target server is recorded.

From this, it is possible to get the full history of a message by identifying the hub or mailbox where the message initially entered the message system, that is, the hub or mailbox where the first event for the message was logged, and getting the sequence of events for the message-id that were logged on this server.

The sequence of events can be interrupted in at least three possible ways. First, transfer of the message to a different message server: there is a transfer-event recording on the target message server. The sequence of events can be followed by querying the log-search RPC service on that server. Second, one or more recipients of the message may have been delivered to a mailbox or failed. If so, a failure tracking event is present in the logs and is the last recorded event for the message. Third, it may be that the message is still present on the message server, but was not yet delivered (e.g., there is no transfer; a delivery failure event is recorded). Such messages/recipients are "Pending" and reported as such to the end user.

Figure 4:
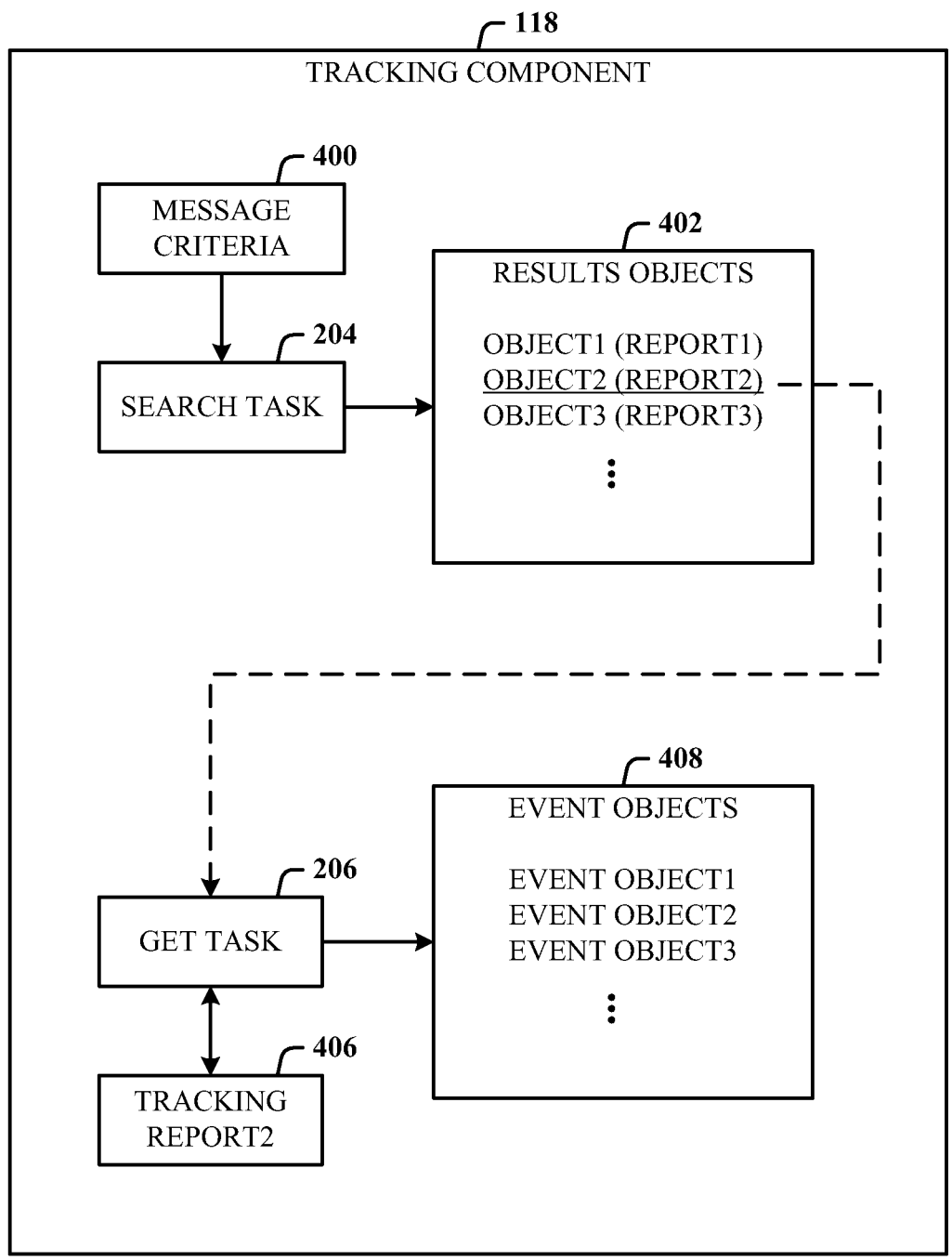
FIG. 4 illustrates a more detailed description of the tracking component and associated tasks.

FIG. 4 illustrates a more detailed description of the tracking component 118 and associated tasks. The above workflow of connecting to the log-search service on each hop in the path of the message and concatenating the tracking events into a single tree of events is implemented by the message-tracking tasks. The tasks can be invoked by a user interface (UI). Users can connect and specify a message to be tracked using the UI. The tracking tasks are then called and the results rendered in a usable fashion.

Tracking can include two major sub-tasks: the search task 204 (e.g., Search-MessageTrackingReport) and the get task 206 (e.g., Get-MessageTrackingReport). With respect to the search task 204, given certain message criteria 400, messages can be found that match the criteria 400. For example, a user may search for all messages sent by the user, with subject=foo. The search task 204 finds all messages matching the criteria 400. The search task 204 returns an array of search results objects 402 (e.g., MessageTrackingSearchResult), each object identifying a single tracking report (e.g., Object1-Report1). The UI renders this object to the end user as a list of messages of which the user can select one message to get the associated detailed report (a tree of tracking events).

With respect to the get task 206, when the user chooses one of the results objects 402 from the previous search task 204 by selecting (e.g., clicking on) the object, the selected object is pipelined into the get task 206. The get task 206 now returns the detailed tracking report 406 for the selected message. The output of the get task 206 is an array of recipient event objects 408 (e.g., RecipientTrackingEvent), which are nodes of the tracking tree previously described.

The event object nodes can be displayed in two modes: summary mode and recipient path mode. In the summary mode, an array of recipient tracking events represents all the recipients of the message and the delivery status of the message to each recipient. This is equivalent to the leaf nodes of the tracking event tree. In the recipient path mode, a single recipient is specified to the task and the task returns an array of recipient tracking event objects that show the path from the root of the tracking event tree to that node. This provides the history of events that occurred for that specific recipient.

Figure 5:
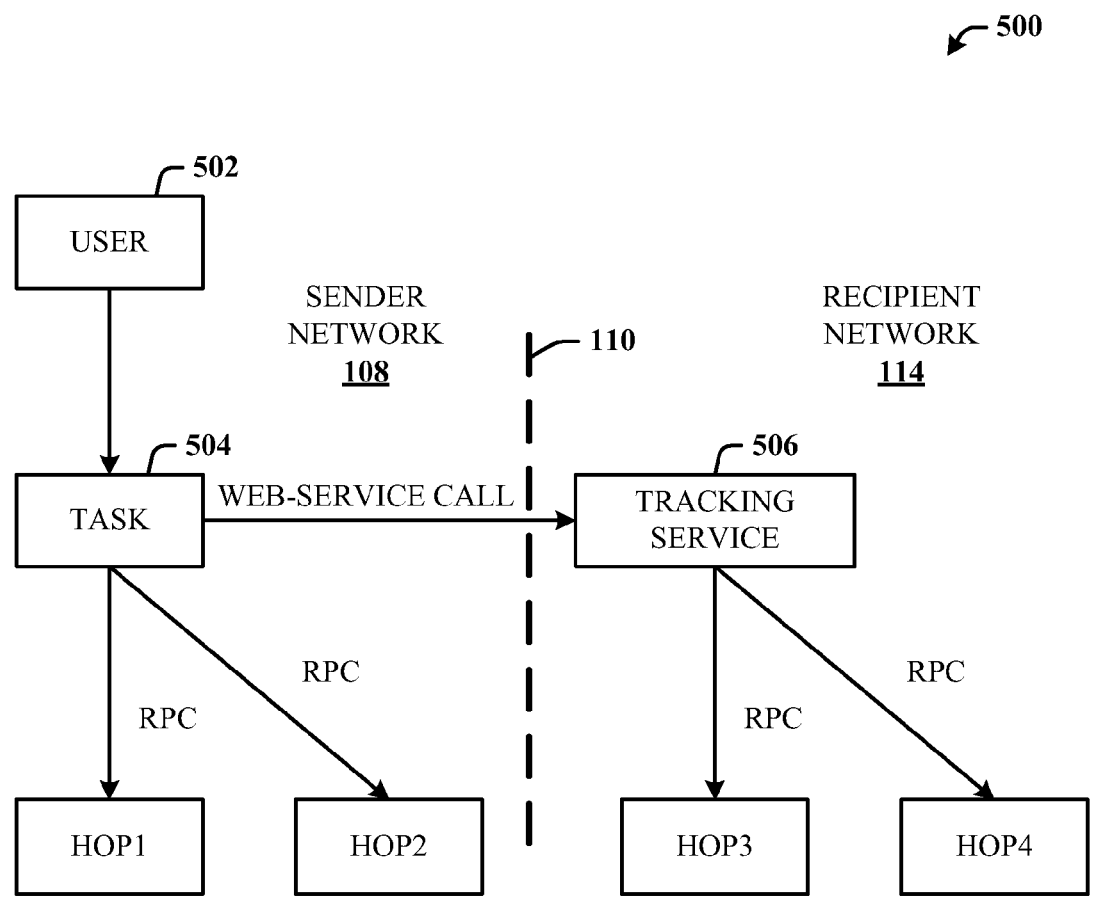
FIG. 5 illustrates a system where a tracking service is deployed in the recipient network to provide cross-boundary message tracking.

FIG. 5 illustrates a system 500 where a tracking service 506 is deployed in the recipient network 114 to provide cross-boundary message tracking. The tracking data can be obtained across a series of hops (e.g., Hop1, Hop2, Hop3, Hop4) in the message path by using RPC, for example, to connect directly to the log-search service (not shown) running on each hop. However, this is a problem if the message traverses multiple network boundaries (e.g., sites or organizations). For example, a user 502 sending a message that travels from Hop1 to Hop2 of the sender network 108 to Hop3 of the recipient network 114 crosses the network boundary 110. The capability of connecting to Hop3 is not an option for a task 504 running in a different cross-boundary network (e.g., the sender network 108).

A tracking service 506 solves this by acting as a proxy for the RPC connections in the recipient network 114. The tracking service 506 is considerably richer than the simple log-search RPC service for the hops. The tracking service 506 is analogous to the task 504 and is able to follow a message across multiple hops (e.g., Hop3 and Hop4), and return a partial tree that is within the scope of the recipient network 114 where the tracking service 506 is running.

Put another way, a computer-implemented message tracking system is provided that comprises a communications framework for communicating a message from a sender of a sender network to a recipient of a recipient network. A tracking service is deployed in the recipient network for providing event information related to tracking the message across the recipient network (e.g., via hops). The trust component determines a trust relationship between the sender network and, the tracking service of the recipient network. The tracking component aggregates tracking information of the message across the recipient network based on the trust relationship, and returns the aggregated tracking information to a requester.

Where network chaining (e.g., across multiple network boundaries) exists, the message is transported across intermediate networks in order to reach the recipient network. The tracking service is deployed in each of the intermediate networks, as well as the recipient network. In one implementation, the trust relationship is determined to exist with the tracking services of the intermediate networks, and the aggregated tracking information includes events of the intermediate networks. In an alternative implementation, the trust relationship is determined to exist only between the sender network and the recipient network, and the aggregated tracking information only includes events of the sender network and the recipient network and not the intermediate networks.

In one implementation, the organization (e.g., Organization A) performing the tracking can only track within organizations with which it has a direct trust relationship (e.g., A ↔ B, A ↔ C). For example, if Organization A trusts both Organization B and Organization C, and/or the trust is bi-directional as well, then tracking can be achieved to the recipient in Organization C through Organization B. In an alternative implementation, trust is developed by some mechanism between the organizations, and the tracking algorithm operates to track through the organizations based on the trust mechanism (e.g., directly specified, transitively, or a form of hierarchical relationship between trusted organizations). The partial trees from the organizations can then be assembled to provide an aggregated set of tracking information.

The tracking component creates a tracking event tree that represents events related to transmission of the message across multiple hops to the recipient. The event tree includes partial trees created based on hops in the sender network as well as partial trees returned from hop events tracked in the intermediate and recipient networks. The tracking component includes a search task for finding tracking information for messages that match message criteria, and a get task for selecting and returning tracking information for the message. The tracking component communicates with the tracking service to obtain the tracking information of the message through the recipient network, and returns all partial paths that resulted in a hand-off of the message to another network.

The main scenario for message tracking is an end user initiating tracking through the task 504 (which user calls the task). The task 504 is the place where most of the authorization (authentication) occurs for the end user. The results are filtered according to what a particular user is authorized to see. For example, when tracking a message of which the user doing the tracking is a recipient, the task filters out all other recipients of the message other than the recipient user; otherwise, it amounts to information disclosure.

All users may call the task 504, and authentication can be controlled through role-based access control, for example. Authorization can be performed by the task 504 by filtering tracking results to exclude data the user is not allowed to see (in some cases resulting in no data being returned).

The task 504 can send a web-service call to the tracking service 506. The web service is not restrictive, and returns all the data without undue restrictions. The web service may search only servers within a specific network boundary, for example, and not have the complete message path, or all message recipients necessary to properly filter out results. For example, if a message is sent from User X to a distribution group, and if the message is submitted in Site A, but the distribution group is expanded in Site B, then the web service returning the partial message path within Site A does not know what recipients the distribution group was expanded. Thus, the web service cannot determine which users are authorized to view the report for the message. In this case the recipients that the distribution group is expanded to all are authorized to see the message, but only the task 504 can determine this by combining the partial information from both network sites.

The web service is provided a high level of access. In one implementation, only network service and message machine accounts can connect to the web service. From remote organizations, only clients presenting a delegate token can connect. Note that delegate tokens are issued to organization level entities. The delegate token asserts the identity of the organization (the network) that is authenticating. Additionally, the authenticating client is permitted access, that is, the domain name presented in the claim in the token matches a domain name listed in a sharing relationship table.

After the client has authenticated and been authorized, the client is fully trusted and any message tracking information requested by the client is returned without filtering. Filtering the result prior to presenting to the end user is performed by the client as the last step before returning results to the end-user.

With respect to the recipient path mode, when tracking a message in recipient path mode, in the web service running in a limited scope, the path may not find the recipient specified in the recipient filter because the recipient may have been added to the message outside the web service's mode. Yet, the path for the recipient may still lie within this scope.

Consider the following example. A User X sends a message to recipient distribution group. The message submission occurs in Organization A. Then the message with recipient distribution group goes to a different organization and is expanded to recipient Y. If it is desired to obtain the recipient path for recipient Y, the following occurs. When the task 504 starts tracking, starting from Organization A, the task calls the web service in Organization A (the recipient network 114) to get the recipient path for recipient Y. At this point the only recipient is the distribution group, so the web service returns nothing. Thus, the task 504 cannot do the tracking.

To solve the problem, it is stipulated that the web service returns all partial-paths that resulted in a hand-off of any recipient to another scope (another network). In this case, the web service determines that there is a recipient path that was handed off to Organization B. The calling task 504 follows referrals, completes all the partial handed-off paths, and then applies the recipient filter. In this example, the task 504 follows the referral to Organization B, gets the expansion/delivery events to recipient Y from Organization B, appends this to the previous partial handoff path to get the complete path, and then applies the recipient filter to the full path. Note that there may be more than one handoff path, so the web service is capable of returning multiple partial paths as part of the result set.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
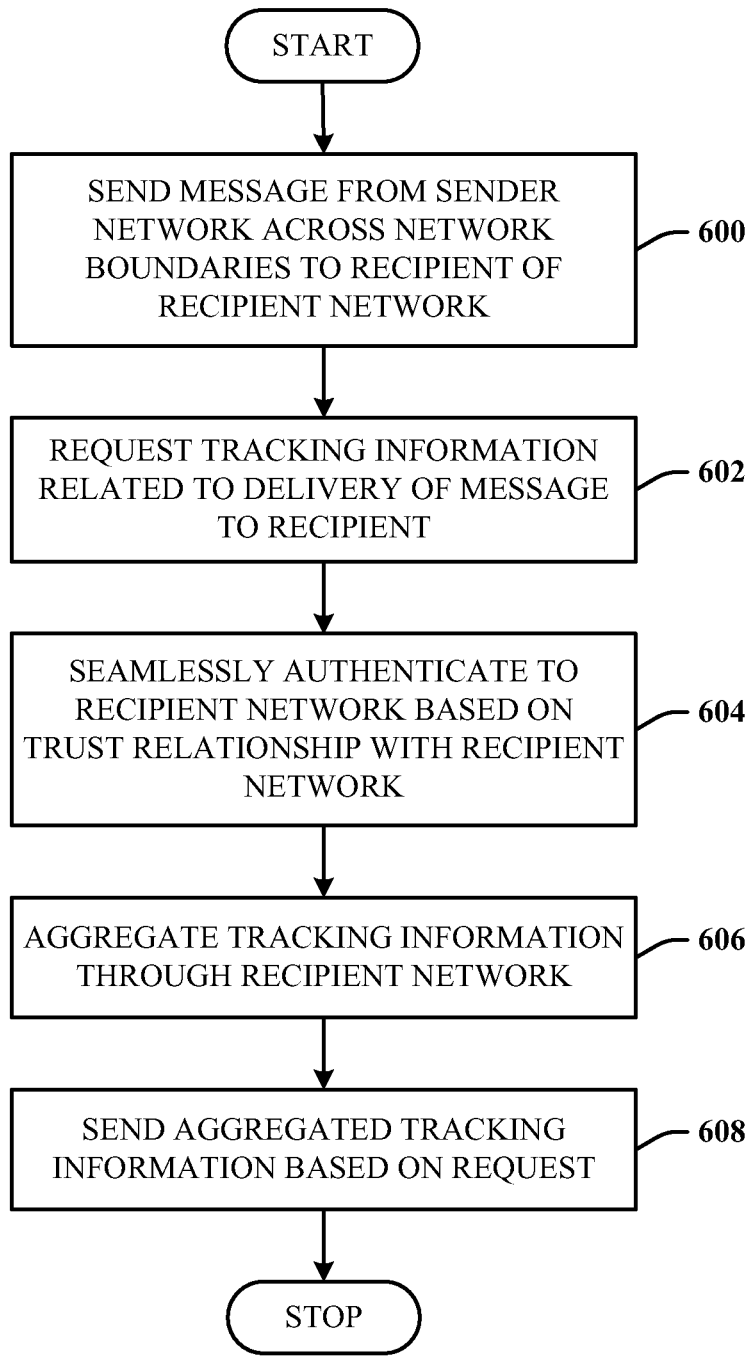
FIG. 6 illustrates a method of tracking message delivery.

FIG. 6 illustrates a method of tracking message delivery. At 600, a message is sent from a sender network across network boundaries to a recipient of a recipient network. At 602, tracking information related to delivery of the message to the recipient is requested. At 604, seamless authentication is to the recipient network based on a trust relationship with the recipient network. That is, the trust relationship is developed between the sender network and the recipient network. At 606, the tracking information is aggregated through the recipient network. At 608, the aggregated tracking information is sent based on the request.

Figure 7:
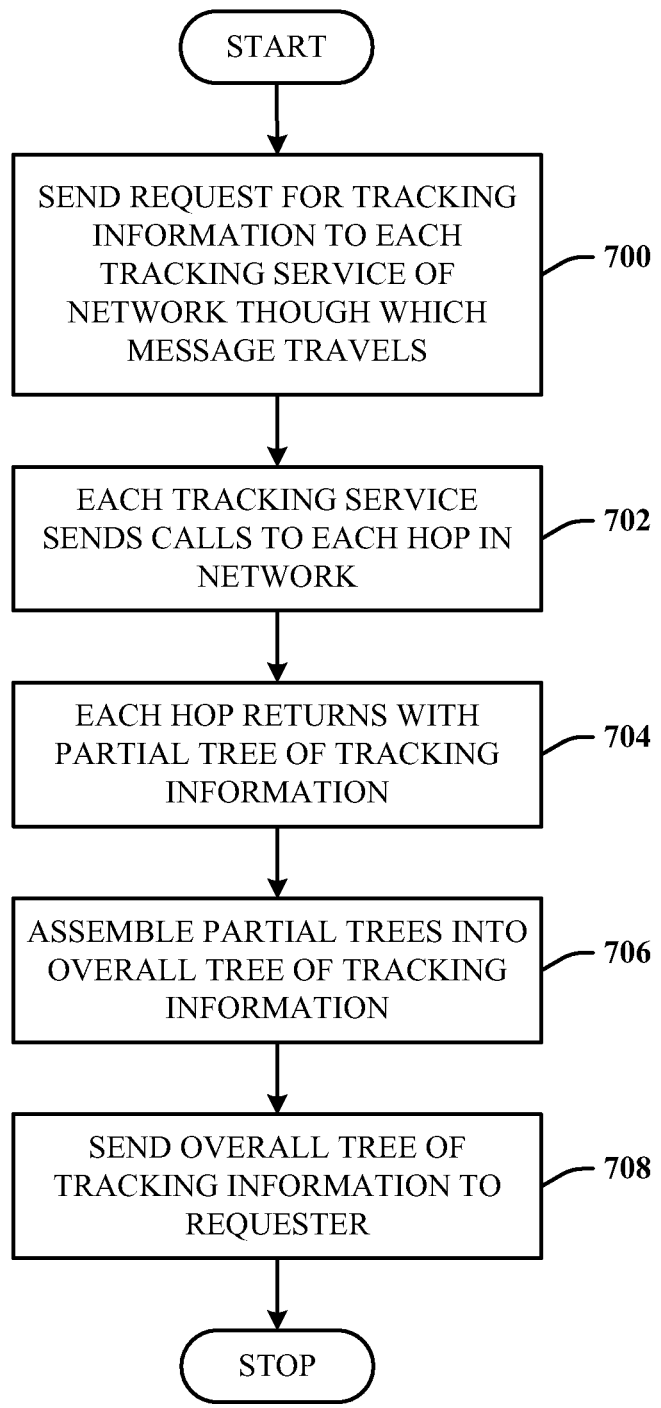
FIG. 7 illustrates a method of creating a tracking event tree that maps message delivery across network boundaries.

FIG. 7 illustrates a method of creating a tracking event tree that maps message delivery across network boundaries. At 700, a request for tracking information is sent to each tracking service of the networks through which the message travels. At 702, each tracking service sends calls to each hop in its network. At 704, each hop returns with a partial tree of tracking information for that hop. At 706, the partial trees are assembled into an overall tree of tracking information. At 708, the overall tree of tracking information is sent to the requester.

Figure 8:
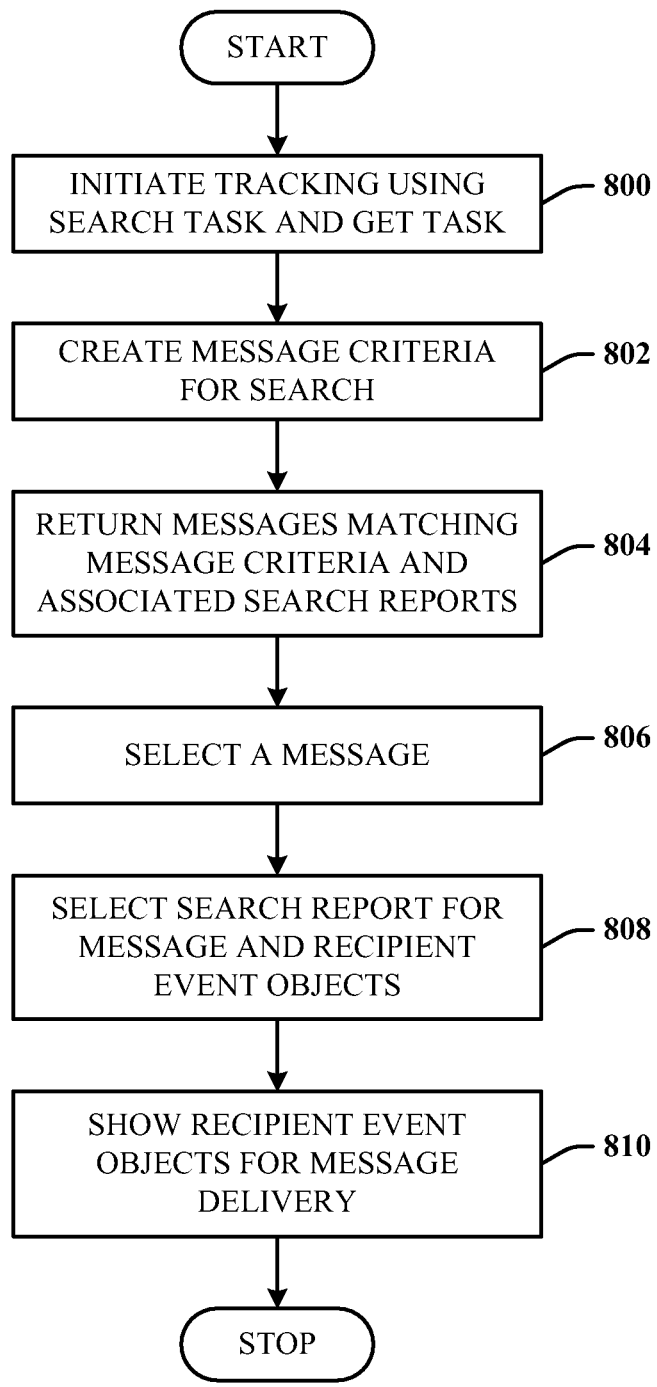
FIG. 8 illustrates a method of obtaining delivery events for a message.

FIG. 8 illustrates a method of obtaining delivery events for a message. At 800, tracking is initiated using a search task and a get task. At 802, message criteria are created for the search. At 804, messages matching the message criteria are returned and the associated search reports. At 806, a message is selected. At 808, the search report for the message is selected and the associated recipient event objects. At 810, recipient event objects for message delivery are shown.

Figure 9:
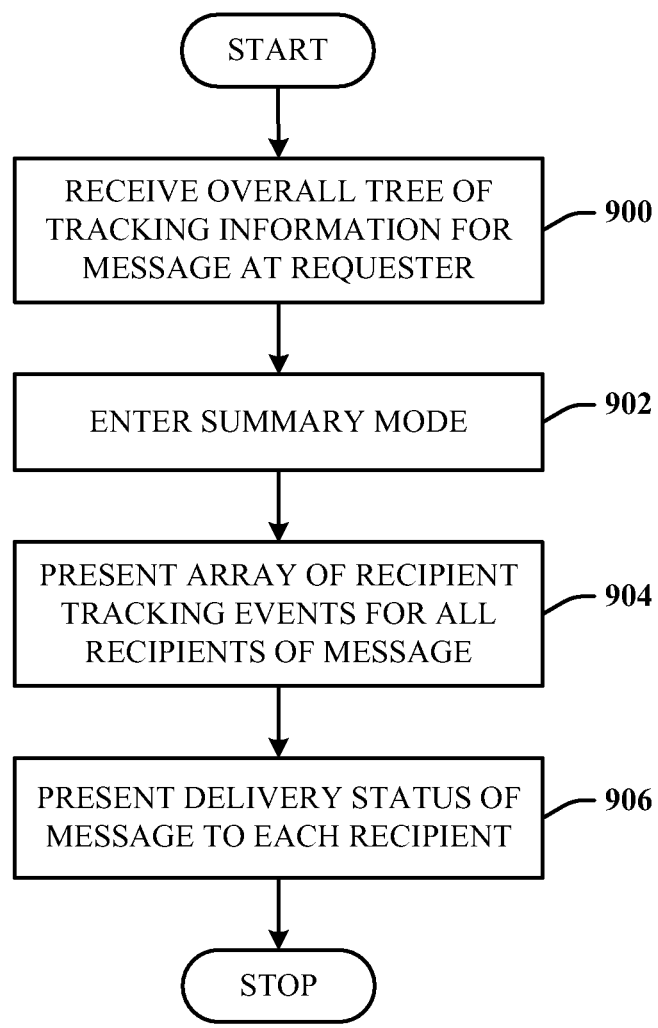
FIG. 9 illustrates a method of showing tracking information using a summary mode.

FIG. 9 illustrates a method of showing tracking information using a summary mode. At 900, an overall tree of tracking information for the message is received at a requester (e.g., user client). At 902, the user enters summary mode via a user interface. At 904, an array of recipient tracking events is presented for all recipients of the message. At 906, the delivery status of the message is presented for each recipient.

Figure 10:
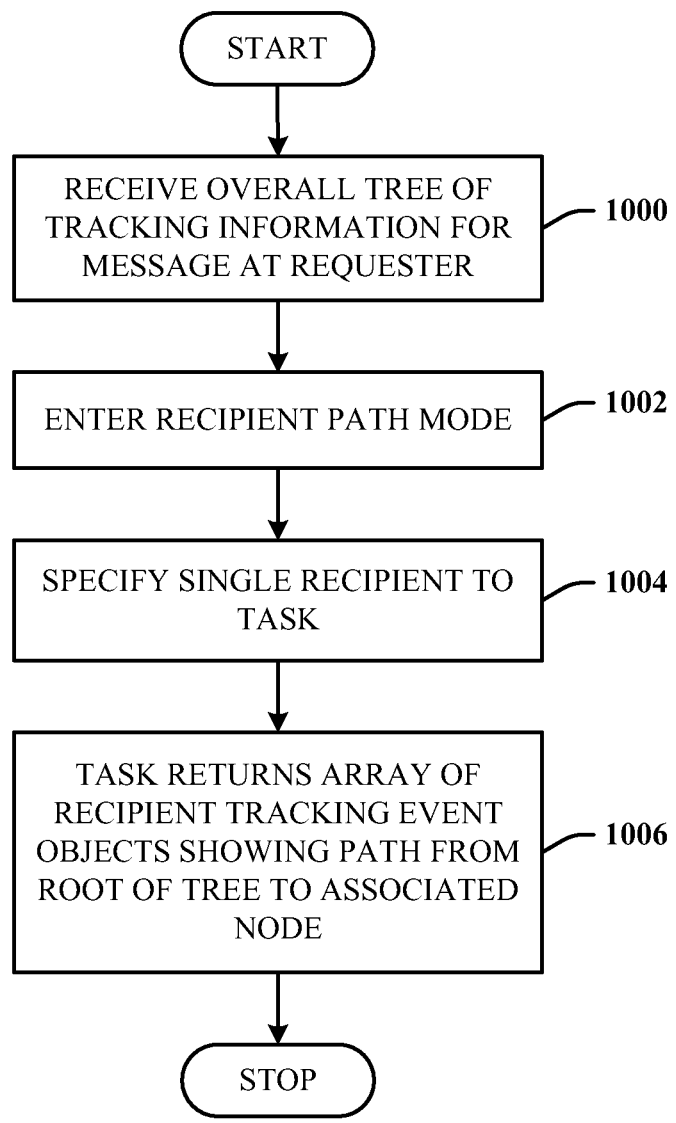
FIG. 10 illustrates a method of showing tracking information using a recipient path mode.

FIG. 10 illustrates a method of showing tracking information using a recipient path mode. At 1000, an overall tree of tracking information for the message is received at a requester (e.g., user client). At 1002, the user enters recipient path mode via a user interface. At 1004, a single recipient is specified to a task. At 1006, the task returns array of recipient tracking event objects showing path from root of tree to associated node.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
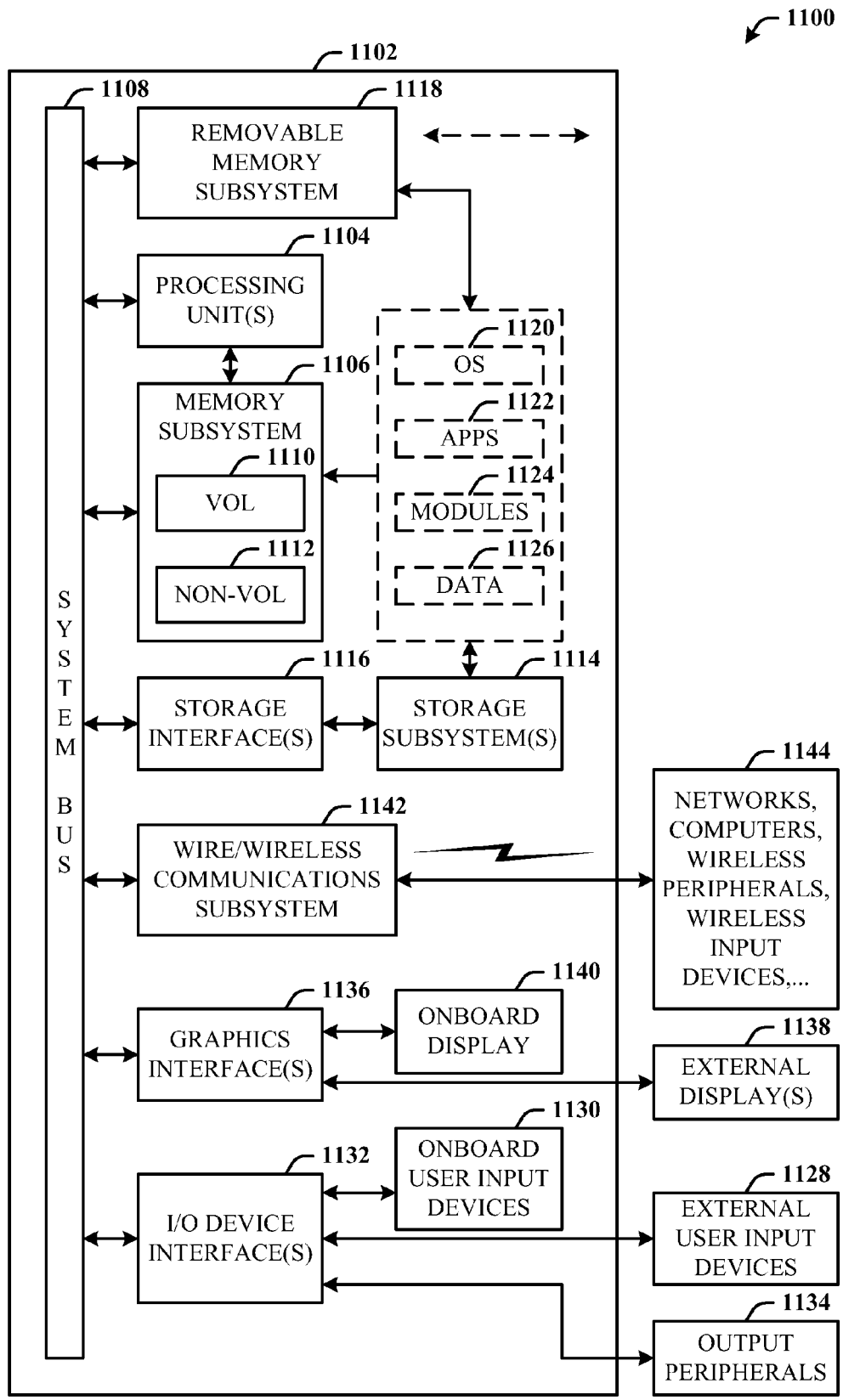
FIG. 11 illustrates a block diagram of a computing system operable to execute cross-boundary message tracking in accordance with the disclosed architecture.

Referring now to FIG. 11, there is illustrated a block diagram of a computing system 1100 operable to execute cross-boundary message tracking in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114, including an operating system 1120, one or more application programs 1122, other program modules 1124, and program data 1126.

The one or more application programs 1122, other program modules 1124, and program data 1126 for the computer 1102, whether the computer 1102 operates as a client machine, or server machine, can include the entities of the system 100 of FIG. 1, the entities of system 200 of FIG. 2, the tree 300 of FIG. 3, the tracking component 118 and entities of FIG. 4, the system 500 of FIG. 5, and the methods of FIGS. 6-10, for example.

Generally, programs include routines, methods, data structures, other software components, etc., that perform particular tasks or implement particular abstract data types.

All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wired/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 12:
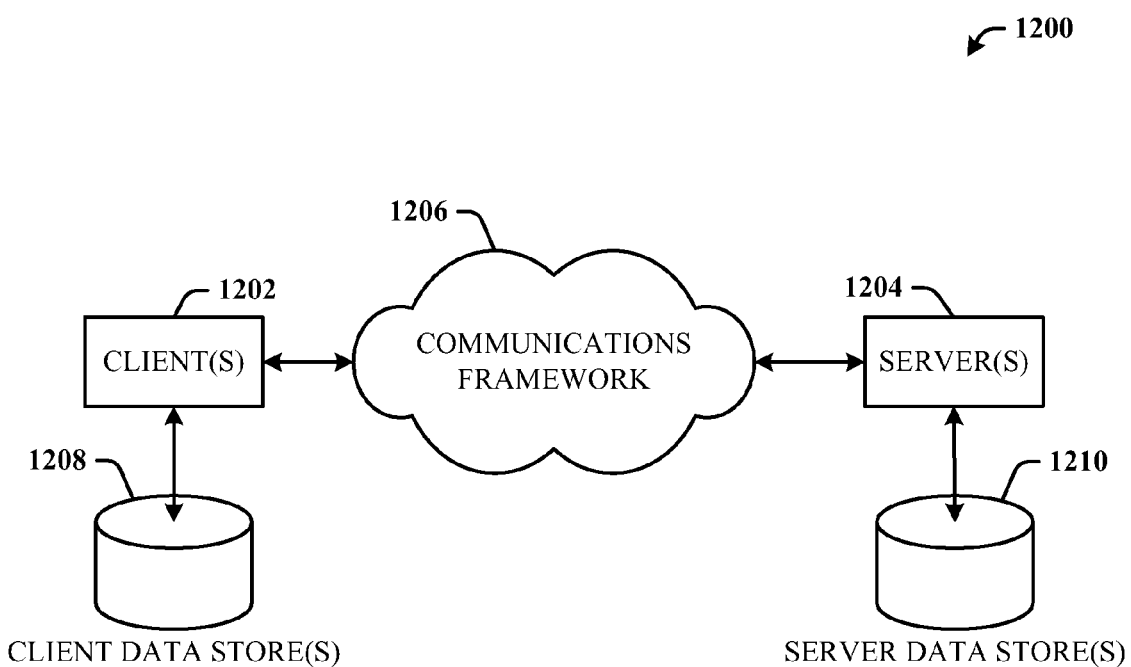
FIG. 12 illustrates a schematic block diagram of a computing environment for cross-boundary message tracking.

Referring now to FIG. 12, there is illustrated a schematic block diagram of a computing environment 1200 for cross-boundary message tracking. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented message tracking system, comprising:

a communications framework for communicating a message from a sender of a sender network of a first organization across a network boundary to a recipient of a recipient network of a second organization;

a trust component for determining a trust relationship between the sender network and the recipient network, based on a trust relationship between the first organization and the second organization;

a tracking component for discovering a location of a tracking service deployed on the recipient network using the trust relationship, and for aggregating tracking information, received from the tracking service on the recipient network, of the message across the network boundary and through the recipient network when a trust relationship between the sender network and the recipient network exists; and a processor implementing one or both of the trust component or the tracking component.

2. The system of claim 1, wherein the tracking component creates a tracking event tree that represents events for distribution of the message to multiple recipients and across multiple hops.

3. The system of claim 1, wherein the tracking component includes a search task for finding tracking information for messages that match message criteria.

4. The system of claim 1, wherein the tracking component includes a get task for selecting and returning tracking information for the message.

5. The system of claim 4, wherein the get task includes a summary mode that presents events for all recipients of the message and delivery status of the message to each recipient.

6. The system of claim 4, wherein the get task includes recipient path mode that provides a history of events that occurred for a specific recipient.

7. The system of claim 1, wherein the tracking service deployed in the recipient network provides event information related to tracking the message across hops in the recipient network.

8. The system of claim 7, wherein the tracking component communicates with the tracking service to obtain the tracking information of the message through the recipient network.

9. The system of claim 7, wherein the tracking service returns all partial paths that resulted in a hand-off of any recipient to another network.

10. A computer-implemented message tracking system, comprising:

a communications framework for communicating a message from a sender of a sender network of a first organization to a recipient of a recipient network of a second organization;

a tracking service deployed in the recipient network for providing event information related to tracking the message across the recipient network;

a trust component for determining a trust relationship between the sender network and the tracking service of the recipient network, based on a trust relationship between the first organization and the second organization;

a tracking component for discovering a location of the tracking service deployed on the recipient network using the trust relationship, and for aggregating tracking information, received from the tracking service, of the message across the recipient network when a trust relationship between the sender network and the recipient network exists, and returning the aggregated tracking information to a requester; and a processor implementing one or more of the trust component or the tracking component.

11. The system of claim 10, wherein the message is transported across intermediate networks in order to reach the recipient network, the tracking service deployed in each of the intermediate networks, a trust relationship determined to exist with the tracking services of the intermediate networks, and the aggregated tracking information includes events of the intermediate networks.

12. The system of claim 10, wherein the tracking component creates a tracking event tree that represents events related to transmission of the message across multiple hops to the recipient.

13. The system of claim 10, wherein the tracking component includes a search task for finding tracking information for messages that match message criteria, and a get task for selecting and returning tracking information for the message.

14. The system of claim 10, wherein the tracking component communicates with the tracking service to obtain the tracking information of the message through the recipient network, and returns all partial paths that resulted in a hand-off of the message to another network.

15. A computer-implemented method of tracking message delivery, comprising:

sending a message from a sender network of a first organization across network boundaries to a recipient of a recipient network of a second organization;

determining a trust relationship between the sender network and the recipient network, based on a trust relationship between the first organization and the second organization;

discovering a location of a tracking service deployed on the recipient network using the trust relationship;

requesting tracking information related to delivery of the message to the recipient from the tracking service on the recipient network;

authenticating to the recipient network based on a trust relationship with the recipient network, the trust relationship with the recipient network based on a trust relationship between the first organization and the second organization;

aggregating the tracking information of the message through the recipient network, the tracking information received from the tracking service on the recipient network, when a trust relationship with the recipient network exists; and sending the aggregated tracking information based on the request.

16. The method of claim 15, further comprising;

tracking the message across one or more hops in the recipient network; and obtaining partial tracking information for each hop though which the message is communicated to create the aggregated tracking information.

17. The method of claim 15, further comprising deploying a proxy service in the recipient network that sends calls to each hop in the recipient network to obtain partial tracking information for that hop.

18. The method of claim 15, further comprising searching the tracking information for all messages that match message criteria using a search task.

19. The method of claim 18, further comprising getting a detailed tracking report for a message returned according to the message criteria.

20. The method of claim 15, further comprising:

generating a tracking event tree that represents all events associated with the message; and displaying nodes of the tree in according to a summary mode or a recipient path mode.

* * * * *